United States Patent
Stauffer et al.

(10) Patent No.: US 9,537,684 B2
(45) Date of Patent: Jan. 3, 2017

(54) ADAPTIVE TRANSMIT BEAMFORMING FOR FREQUENCY DIVISION DUPLEXING SYSTEMS

(75) Inventors: Erik Richard Stauffer, Mountain View, CA (US); Kamlesh Rath, San Ramon, CA (US); Ying Xia, Saratoga, CA (US); Bertrand Hochwald, South Bend, IN (US)

(73) Assignee: Broadcom Corporation, Irvine, CA (US)

( * ) Notice: Subject to any disclaimer, the term of this patent is extended or adjusted under 35 U.S.C. 154(b) by 676 days.

(21) Appl. No.: 13/436,513

(22) Filed: Mar. 30, 2012

(65) Prior Publication Data

US 2013/0258873 A1   Oct. 3, 2013

(51) Int. Cl.
*H04L 1/00* (2006.01)
*H04L 25/03* (2006.01)
(Continued)

(52) U.S. Cl.
CPC ....... *H04L 25/03343* (2013.01); *H04B 7/0617* (2013.01); *H04B 7/0626* (2013.01); *H04L 1/0002* (2013.01); *H04L 1/0034* (2013.01); *H04L 25/0232* (2013.01); *H04B 7/0404* (2013.01); *H04L 1/1607* (2013.01)

(58) Field of Classification Search
CPC ............... H04L 5/0023; H04L 25/0204; H04L 25/03891; H04L 5/0053; H04L 5/023; H04L 1/0003; H04L 1/0009; H04L 1/06; H04L 1/0606; H04L 1/0625; H04L 1/0631; H04L 1/0643; H04L 1/065; H04L 1/0668; H04L 1/0002; H04L 1/0034; H04L 1/1607; H04L 25/0232; H04L 25/03343; H04B 7/0404; H04B 7/0617; H04B 7/0626
(Continued)

(56) References Cited

U.S. PATENT DOCUMENTS 6,680,932 B1 *   1/2004   Hsuan et al. ................. 370/350
8,164,496 B2 *   4/2012   Velazquez .................... 341/118
(Continued)

FOREIGN PATENT DOCUMENTS

EP   1 351 407 A2   10/2003

OTHER PUBLICATIONS

Philips. "MIMO Performance using STTCC for E-UTRA Downlink," 3GPP TSG RAN WG1 meeting #46, Tallinn, Estonia, 6 pages, Aug. 28-Sep. 1, 2006.
(Continued)

*Primary Examiner* — Jung Park
*Assistant Examiner* — M Mostazir Rahman
(74) *Attorney, Agent, or Firm* — Sterne, Kessler, Goldstein & Fox P.L.L.C.

(57) ABSTRACT

Embodiments of a method and apparatus for performing an adaptive transmission scheme in a frequency division duplexing communication system based on channel state information estimated using an open-loop mode are described herein. In one example, the method includes estimating an impulse response of a channel using a signal received over a first frequency band of the channel from a device, transforming the impulse response into a frequency response of the channel, and subsequently performing the adaptive transmission scheme using the frequency response to transmit a signal to the device over a second frequency band of the channel that is different from the first frequency band.

21 Claims, 5 Drawing Sheets

(51) Int. Cl.
*H04B 7/06* (2006.01)
*H04L 25/02* (2006.01)
*H04L 1/16* (2006.01)
*H04B 7/04* (2006.01)

(58) Field of Classification Search
USPC ........................................ 370/252, 276–281
See application file for complete search history.

(56) References Cited

U.S. PATENT DOCUMENTS

| | | | |
|---|---|---|---|
| 8,194,774 B2 | 6/2012 | Hochwald et al. | |
| 8,675,761 B2 | 3/2014 | Tujkovic et al. | |
| 2007/0211815 A1* | 9/2007 | Pan et al. | 375/267 |
| 2008/0305818 A1* | 12/2008 | Ko et al. | 455/509 |
| 2009/0141673 A1 | 6/2009 | Hwang et al. | |
| 2009/0196166 A1 | 8/2009 | Hamaguchi et al. | |
| 2009/0225687 A1* | 9/2009 | Hart et al. | 370/280 |
| 2010/0111089 A1* | 5/2010 | Hsu | H04W 28/18 370/392 |
| 2010/0118729 A1* | 5/2010 | Sousa et al. | 370/252 |
| 2010/0150217 A1 | 6/2010 | Jwa et al. | |
| 2011/0205913 A1* | 8/2011 | Van Zelst et al. | 370/252 |
| 2012/0127948 A1* | 5/2012 | Chung et al. | 370/329 |

OTHER PUBLICATIONS

"3$^{rd}$ Generation Partnership Project; Technical Specification Group Radio Access Network; Physical Layer Aspects for Evolved UTRA (Release 7)," 3GPP Standard, 3GPP TR 25.814, 72 pages, Nov. 2005.

Philips, "Coded MIMO-OFDM Schemes for E-UTRA," 3GPP TSG RAN WG1 meeting #43, Seoul, Korea, 10 pages, Nov. 11, 2005.

Keller, T. et al., "Adaptive Multicarrier Modulation: A Convenient Framework for Time-Frequency Processing in Wireless Communications," *IEEE Proceedings of the IEEE*, vol. 88, No. 5, pp. 611-640, May 2000.

Partial European Search Report, mailed Sep. 22, 2014, for European Appl. No. 12006724.4, 6 pages.

European Office Action directed to related European Patent Application No. 12 006 724.4-1851, mailed Jun. 28, 2016; 5 pages.

* cited by examiner

ADAPTIVE TRANSMIT BEAMFORMING FOR FREQUENCY DIVISION DUPLEXING SYSTEMS

FIELD OF THE INVENTION

This application relates generally to beamforming and, more particularly, to transmit beamforming.

BACKGROUND

Transmit beamforming is a signal processing technique that uses two or more antennas at a transmitter to increase the signal to interference plus noise ratio (SINR) at a receiver and, thereby, the reliability and/or rate at which data can be communicated from the transmitter to the receiver. The basic operation of transmit beamforming is to send the same signal to the receiver from each of the two or more antennas at the transmitter. However, a different complex scaling factor (or set of complex scaling factors) is applied to the signal sent from each antenna.

In order to improve the SINR at the receiver, the values of the different complex scaling factors (or sets of complex scaling factors) should be determined based on state information (e.g., the frequency or impulse response) of the wireless channel used to convey signals from the transmitter to the receiver. In a time division duplexing (TDD) system, the frequency band of the wireless channel used to convey signals from the transmitter to the receiver is the same frequency band used to convey signals in the opposite direction, from the receiver to the transmitter. Therefore, because the frequency bands are the same, the transmitter can form an estimate of the state information of the wireless channel based on a signal it receives from the receiver and use that estimate to perform transmit beamforming.

In a frequency division duplexing (FDD) system, however, different frequency bands are used to send signals in each direction between the two devices over the wireless channel. As a result, rather than the transmitter forming an estimate of the state information of the wireless channel based on a signal it receives from the receiver and using that estimate to perform transmit beamforming, such a system would conventionally operate in a closed-loop mode to form an estimate of the state information of the wireless channel for use in transmit beamforming. More specifically, in such a system, the receiver would estimate the state information of the wireless channel based on a signal it receives from the transmitter and then feed this estimated state information (or some compressed indication of this estimated state information) back to the transmitter for use in transmit beamforming. Although the closed-loop mode provides a viable solution for estimating the state information of the wireless channel in a FDD system for use in transmit beamforming, such a closed loop mode can be slow to adapt to changing channel conditions (e.g., due to movement of the transmitter and/or receiver) and further increases overhead.

Therefore, what is needed is a method and apparatus that can more quickly and/or more efficiently estimate state information of a wireless channel in a FDD system for transmit beamforming.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Overview

The various embodiments of the present disclosure are described herein with particular reference to orthogonal frequency division multiplexing (OFDM) communication systems. In order to facilitate a better understanding of these various embodiments, the basic principles of OFDM transmission and transmit beamforming, as applied to OFDM, are first reviewed here. It should be noted, however, that the various embodiments of the present disclosure can be implemented in systems using communication schemes other than OFDM.

In general, OFDM is a multicarrier communication scheme that transmits data over F orthogonal tones (or sub-carriers). Before transmission, the data is mapped to a series of complex symbols (e.g., QAM or QPSK symbols), referred to as source symbols, and divided into F parallel symbol streams. The F parallel symbol streams are treated as though they are in the frequency-domain and are used as inputs to an inverse fast Fourier transform (IFFT) block that transforms them into the time-domain. The IFFT block specifically takes in F source symbols at a time, one from each of the F parallel symbol streams, and uses each to modulate the amplitude and phase of a different one of F sinusoidal basis functions that correspond to the F orthogonal tones. The output of the IFFT block is F time-domain samples that represent the summation of the F orthogonal tones. The F time-domain samples form a single OFDM symbol. After some additional processing and up-conversion, the OFDM symbol (and others) provided by the IFFT block are transmitted across a particular frequency band of a wireless channel, using an antenna, to an OFDM receiver.

To perform beamforming in an OFDM transmitter, the same OFDM symbols are transmitted from two or more antennas. However, a different set of beam weights is applied to the OFDM symbols before they are sent. More specifically, and in at least one example, each of the two or more antennas has a dedicated IFFT block (or a dedicated time slice of a time-multiplexed IFFT block) and each IFFT block receives the same F source symbols from which to generate an OFDM symbol. However, prior to each IFFT block receiving the same F source symbols, a beamformer applies a different set of beam weights to each copy. The sets of beam weights include F complex scaling factors, one for each symbol of the F source symbols, and are used by the beamformer to adjust the respective magnitudes and/or phases of the F source symbols. In order to improve the SINR at the intended receiver using transmit beamforming, the values of the different sets of beam weights are determined based on state information of the wireless channel used to convey signals from the transmitter to the receiver.

Described below is an open-loop method and apparatus for estimating state information of a wireless channel in a FDD system. The estimated state information can be used to perform transmit beamforming and other channel aware adaptive transmission schemes.

II. Open-Loop Estimation of Channel State Information in a FDD System

Figure 1:
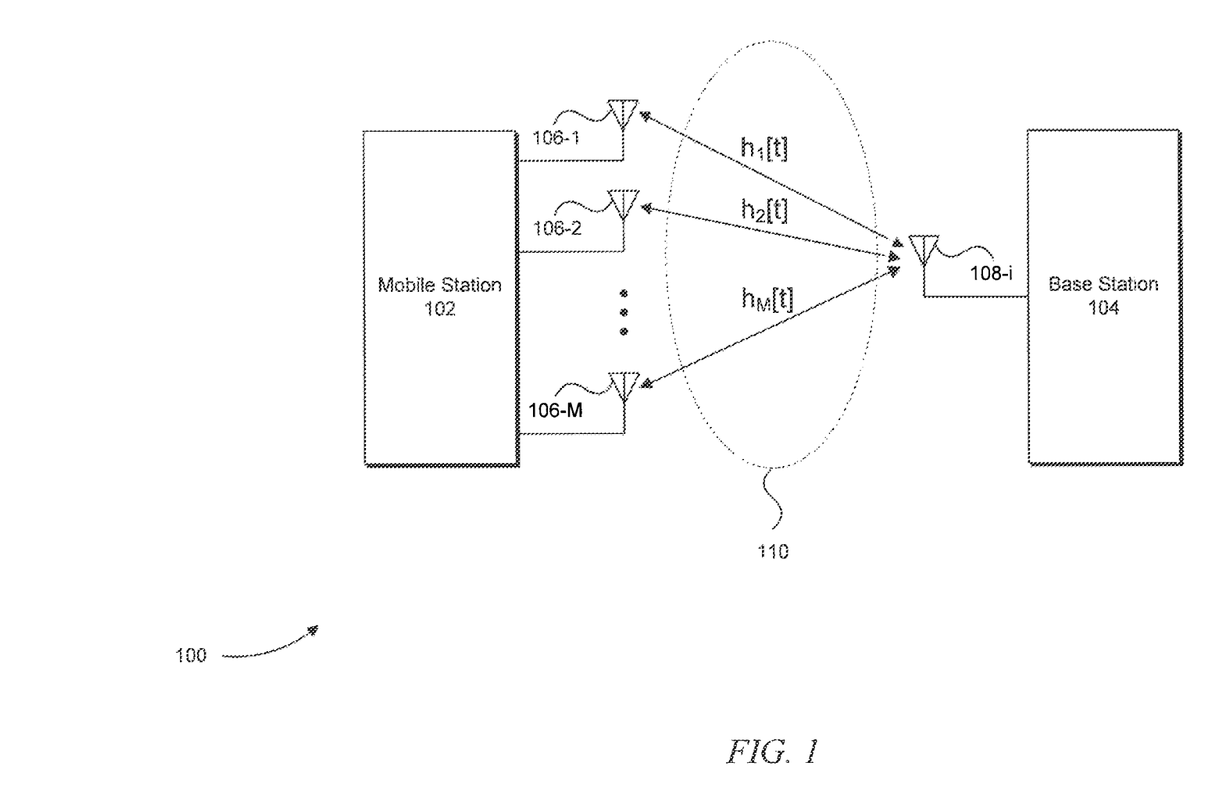
FIG. 1 illustrates an example wireless communication system in which embodiments of the present disclosure can be implemented.

FIG. 1 illustrates an exemplary wireless communication system 100 in which embodiments of the present disclosure can be implemented. As illustrated in FIG. 1, exemplary wireless communication system 100 includes a mobile station 102 (e.g., a mobile phone, laptop, pager, etc.) and a base station 104 that are configured to communicate with each other over a wireless channel 110 using a wireless network technology operating in a FDD mode. For example, mobile station 102 and base station 104 can communicate with each other over wireless channel 110 using one of the following wireless network technologies operating in a FDD mode: Long Term Evolution (LTE), Institute of Electrical and Electronic Engineers (IEEE) 802.16 (WiMAX), and IEEE 802.11 (Wi-Fi).

Because wireless communication system 100 is operating in a FDD mode, different frequency bands are used to send signals over wireless channel 110 in each direction between mobile station 102 and base station 104. In the discussion below, the frequency band used by base station 104 to transmit information to mobile station 102 will be referred to as the downstream frequency band, and the frequency band used by mobile station 102 to transmit information to base station 104 will be referred to as the upstream frequency band.

In operation of wireless communication system 100, base station 104 is configured to act as an access point to connect mobile station 102 to a wired network (not shown) by relaying data between mobile station 102 and the wired network. To improve the SINR at base station 104 and, thereby, the reliability and/or rate at which data can be communicated to base station 104, mobile station 102 includes multiple antennas, 106-1 through 106-M, and uses these antennas to perform transmit beamforming. Mobile station 102 specifically performs transmit beamforming by sending the same transmit signal over wireless channel 110 to base station 104 from each antenna, 106-1 through 106-M, albeit with a different set of beam weights applied to the signal sent from each antenna.

As noted above, the different sets of beam weights should be determined based on state information (e.g., the frequency or impulse responses) of wireless channel 110. In conventional FDD systems, the state information of wireless channel 110 is estimated using a closed-loop mode, where base station 104 would estimate the state information of wireless channel 110 based on a signal it receives from mobile station 102 and then feed the estimated state information (or some compressed indication of the estimated state information) back to mobile station 102 for use in transmit beamforming. In contrast to these conventional FDD systems, mobile station 102 is configured to estimate the state information using an open-loop mode. More specifically, mobile station 102 operating in the open loop mode is configured to estimate the state information of wireless channel 110 based on a signal it receives from base station 104, despite the fact that the two stations transmit to each other over different frequency bands of the wireless channel. Two specific embodiments of this open-loop mode are described below.

a. First Open-Loop Mode Embodiment

In performing the open-loop mode in a first embodiment, mobile station 102 first forms an initial estimate of the state information of wireless channel 110 using, for example, known training sequences (e.g., in the form of preambles or pilot tones) sent to it by base station 104 over the downstream frequency band. This initial estimate of the state information of the wireless channel can be expressed as a vector of time-domain impulse responses $h_1[t]$-$h_m[t]$ that each correspond to, and characterize, a different one of the "sub-channels" between antenna 108-$i$ at base station 104 and antennas 106-1 through 106-M at mobile station 102. For example, mobile station 102 can specifically estimate the impulse response $h_1[t]$ based on a signal sent from antenna 108-$i$ at base station 104 and received by antenna 106-1 at mobile station 102. The impulse responses of the other sub channels can be estimated in a similar manner based on the same signal sent from antenna 108-$i$ at base station 104 but received by their corresponding antennas at mobile station 102.

Once estimated, mobile station 102 can use the impulse responses $h_1[t]$-$h_m[t]$ to perform transmit beamforming. To better understand how these impulse responses can be used to perform transmit beamforming, despite the fact that they were estimated based on a signal received over a different frequency band than the one in which transmit beamforming is to be performed over, it is instructive to consider a representative one of the impulse responses in isolation. For example, consider the impulse response $h_1[t]$ shown in FIG. 1. This impulse response represents the initial estimated state information of the sub-channel between antenna 108-$i$ at base station 104 and antenna 106-1 at mobile station 102 and can be expressed generally by the following equation:

$$h_1[t] = \sum_{n=0}^{N-1} \rho_n e^{-j\theta_n} \delta[t - \tau_n] \quad (1)$$

where N is the number of taps of the impulse response (which is equivalent to the number of receive paths between antenna 108-$i$ and antenna 106-1), $\tau_n$ is the time delay of the $n^{th}$ tap, and $\rho_n e^{-j\theta_n}$ is the complex amplitude of the $n^{th}$ tap (where $\rho_n$ is the amplitude and $\theta_n$ is the phase).

Figure 2:
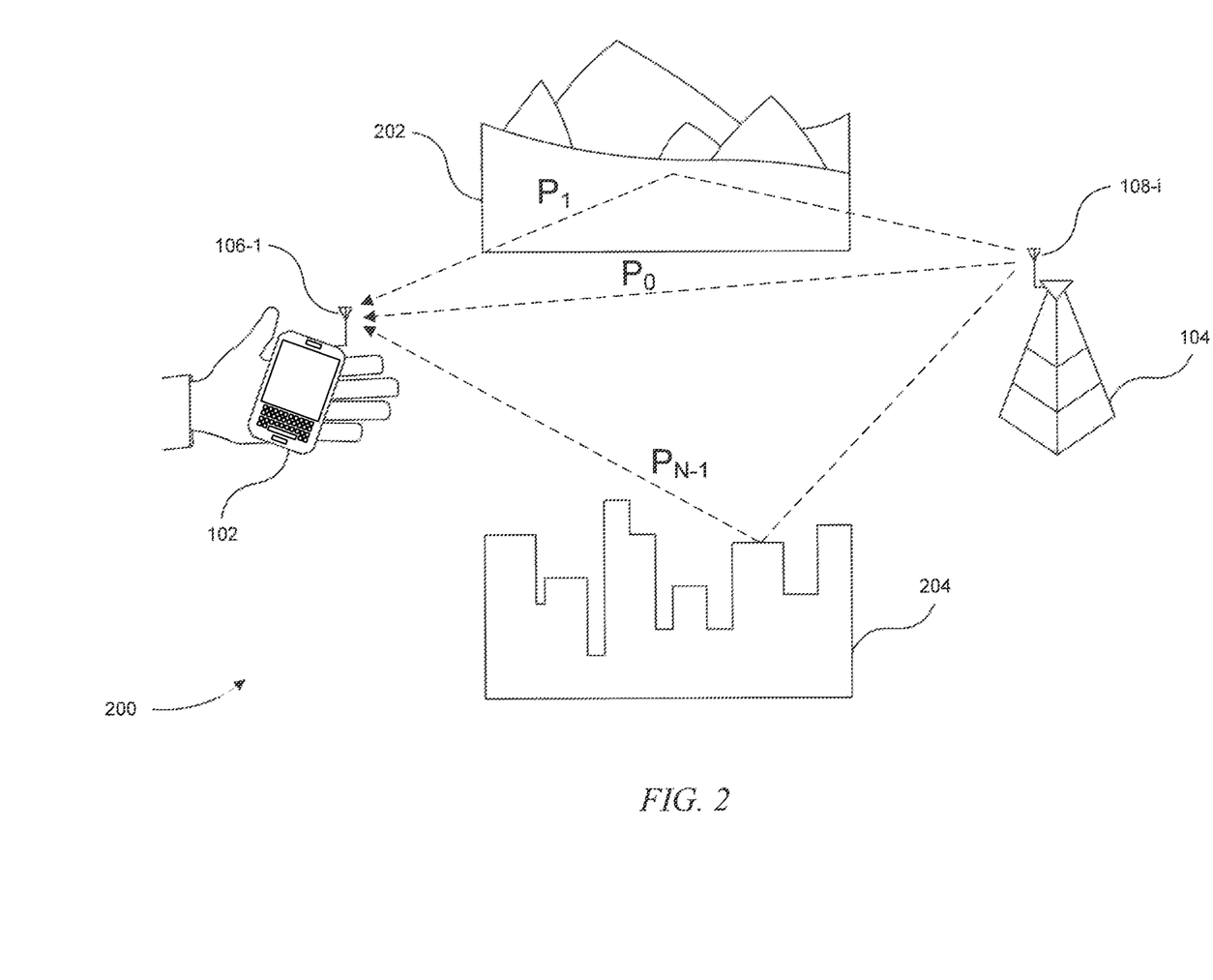
FIG. 2 illustrates an example multipath channel.
Figure 3:
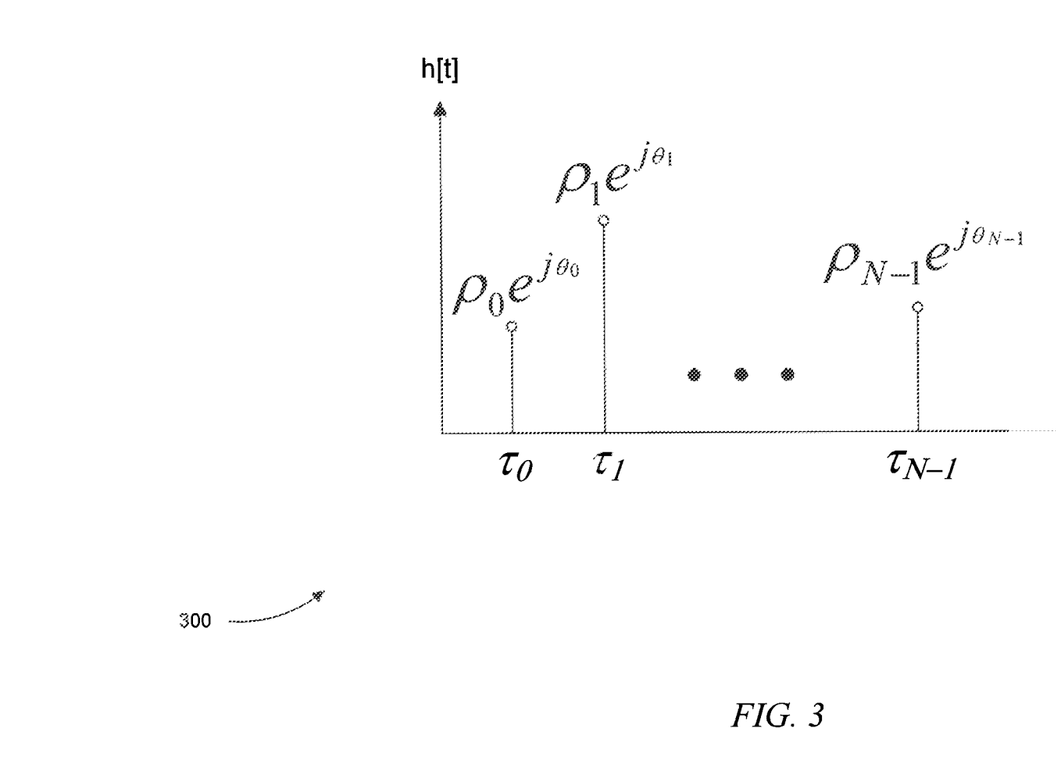
FIG. 3 illustrates an example impulse response of a multipath channel.

For wireless channels, the number of taps N is typically greater than one because transmitted radio signals can reflect off of objects in the channel and reach an antenna at a receiver via multiple different paths. FIG. 2 depicts some example receive paths 200 between antenna 108-$i$ at base station 104 and antenna 106-1 at mobile station 102. The multiple paths shown, $P_0$, $P_1$, and $P_{N-1}$, are caused by reflections of the signal transmitted from antenna 108-$i$ off of mountains or hills 202 and buildings 204, as well as by the un-reflected propagation of the transmitted signal between base station 104 and mobile station 102. Path $P_0$ corresponds to the complex amplitude $\rho_0 e^{-j\theta_0}$ of tap zero expressed in Eq. (1), path $P_1$ corresponds to the complex amplitude $\rho_1 e^{-j\theta_1}$ of tap one expressed in Eq. (1), and $P_{N-1}$ corresponds to the complex amplitude $\rho_{N-1} e^{-j\theta_{N-1}}$ of tap N-1 expressed in Eq. (1). A visual depiction 300 of the impulse response $h_1[t]$ is further shown in FIG. 3.

In performing the open-loop mode, mobile station 102 relies on the fact that the impulse response $h_1[t]$ will have the same or very similar tap delays $\tau_n$ and number of taps N regardless of the specific frequency band over which the signal used to determine the impulse response $h_1[t]$ was received. This fact generally holds true because the tap delays $\tau_n$ and the number of taps N are primarily dependent on the speed of light and the position of scattering objects in the sub-channel, which do not change with frequency. Therefore, the tap delays $\tau_n$ and the number of taps N of the impulse response $h_1[t]$, which were determined based on a signal received over the frequency band used to transmit signals from base station 104 to mobile station 102, can be assumed to be the same for an impulse response of the sub-channel determined based on a signal received over the frequency band used to transmit signals in the opposite direction over the sub-channel, from mobile station 102 to base station 104.

The complex amplitude $\rho_n e^{-j\theta_n}$ of each of the N taps of the impulse response $h_1[t]$, however, will change with frequency. In particular, the phase $\theta_n$ and amplitude $\rho_n$ will change with the frequency band over which the signal used to determine the impulse response $h_1[t]$ is received due to, for example, changes in the scattering properties of objects in wireless channel 110 with frequency. However, it can be shown that the phase $\theta_n$ and amplitude $\rho_n$ often do not change appreciably between the frequency band used to transmit signals from base station 104 to mobile station 102 and the frequency band used to transmit signals in the opposite direction, from mobile station 102 to base station 104, especially when the frequency separation between the two bands is small.

Given the above, the impulse response $h_1[t]$, determined based on signals received over the downstream frequency band, can be transformed into the frequency domain and evaluated at one or more frequencies outside the downstream frequency band to determine the frequency response of wireless channel 110 at those one or more frequencies. In particular, the impulse response $h_1[t]$ can be transformed into the frequency domain and evaluated at one or more frequencies that fall within the upstream frequency band to determine the frequency response of wireless channel 110 at those one or more frequencies. The determined frequency response information can then be used by mobile station 102 to perform transmit beamforming as would be appreciated by one of ordinary skill in the art.

For example, assuming that mobile station 102 transmits an OFDM signal to base station 104, mobile station 102 can evaluate the frequency domain representation of the impulse response $h_1[t]$ at the transmit frequency of one or more of the orthogonal tones (also called sub-carriers) that make up the OFDM signal to determine the frequency response of wireless channel 110 for those frequencies. The determined frequency response information can then be used by mobile station 102 to determine beam weights to adjust the phase of those orthogonal tones of the OFDM signal transmitted from antenna 106-1 to perform transmit beamforming as would be appreciated by one of ordinary skill in the art.

It should be noted that one or more of the impulse responses $h_2[t]$-$h_m[t]$ can and should be similarly transformed into the frequency domain and evaluated to obtain frequency response information so that transmit beamforming can be performed. For example, given that each antenna 106-1 through 106-M transmits the same OFDM signal, the individual tones of the OFDM signal sent from each antenna will likely arrive at antenna 108-$i$ at base station 104 with a phase difference relative to the corresponding tones of the other OFDM signal copies, which impacts the strength of the tones of the OFDM signal at base station 104. In general, transmit beamforming uses the frequency response information, determined based on the impulse responses $h_1[t]$-$h_m[t]$ as described above, to calculate and adjust for (using the beam weights) the relative phase differences between corresponding tones of the OFDM signal copies in a way that better aligns the phases of the corresponding tones of the OFDM signal copies at antenna 108-$i$ at base station 104, thereby increasing SINR.

In addition, it should be noted that the impulse responses $h_1[t]$-$h_m[t]$ can be transformed into the frequency domain using the discrete Fourier transform (DFT) performed in hardware, software, or any combination thereof. In addition, it should be further noted that the frequency domain representation of an impulse response for a particular sub-channel can be referred to as the frequency response for that particular sub-channel.

In an embodiment, before one of the estimated impulse responses $h_1[t]$-$h_m[t]$ is transformed into the frequency domain, the phase $\theta_n$ and/or amplitude $\rho_n$ of one or more of its taps can be adjusted. For example, the phase $\theta_n$ and/or amplitude $\rho_n$ can be adjusted to account for a difference in frequency between the frequency band in which the signal used to estimate the impulse response was received (i.e. the upstream frequency band) and the frequency band in which the frequency domain representation of the impulse response is to be evaluated (i.e., the downstream, frequency band). A linear model or an affine model of how the phase $\theta_n$ and/or amplitude $\rho_n$ change with frequency can be used to determine the adjustment.

In another embodiment, mobile station 102 can use one or more of the impulse responses $h_1[t]$-$h_m[t]$ to adjust state information of wireless channel 110 determined using the conventional closed-loop mode. More specifically, assuming feedback from base station 104 containing estimated state information of wireless channel 110 (or some compressed indication of this estimated state information of wireless channel 110) is received, mobile station 102 can use one or more of the impulse responses $h_1[t]$-$h_m[t]$ to adjust (or update) the state information fed back from base station 104. This can be advantageous in instances where the conventional closed-loop method is too slow to keep up with the changing state information of wireless channel 110 (e.g., due to movement of the transmitter and/or receiver). Once adjusted, the estimated state information fed back from base station 104 can be used to determine beam weights for performing transmit beamforming at mobile station 102.

It should be noted that, mobile station 102 can alternatively form estimates of the frequency responses for each "sub-channel" between antenna 108-$i$ at base station 104 and antennas 106-1 through 106-M at mobile station 102 based on known training sequences (e.g., in the form of preambles or pilot tones) sent to it by base station 104 over the downstream frequency band. Mobile station 102 can perform extrapolation on these estimated frequency responses to determine frequency response information for frequencies that fall within the upstream frequency band. The extrapolated frequency response information can then be used to perform transmit beamforming over the upstream frequency band as would be appreciated by one of ordinary skill in the art based on the teachings herein.

b. Second Open-Loop Mode Embodiment

In a second embodiment of the open loop mode, base station 104 transmits OFDM signals from antenna 108-$i$ to mobile station 102 over two separate downstream frequency bands, and mobile station 102 uses the joint information contained in the OFDM signals to perform transmit beamforming over an upstream frequency band.

More specifically, and in one embodiment, base station 104 transmits a first OFDM signal from antenna 108-$i$ to mobile station 102 over a first downstream frequency band and transmits a second OFDM signal to mobile station 102 from antenna 108-$i$ over a second downstream frequency band. Once received, mobile station 102 respectively processes the first and second OFDM signals received by each antenna 106-1 through 106-M at base station 102.

For example, mobile station 102 uses known training sequences (e.g., in the form of preambles or pilot tones) carried by the first OFDM signal received by antenna 106-1 to estimate a frequency response of wireless channel 110 at the transmission frequencies of one or more orthogonal tones in the first OFDM signal. This frequency response can be denoted F1. Similarly, mobile station 102 uses known training sequences (e.g., in the form of preambles or pilot tones) carried by the second OFDM signal received by antenna 106-1 to estimate a frequency response of wireless channel 110 at the transmission frequencies of one or more orthogonal tones in the second OFDM signal. This frequency response can be denoted F2.

Using the two frequency responses F1 and F2 and linear algebra, mobile station 102 can then solve for an impulse response that, when transformed into the frequency domain using the DFT, substantially approximates or fits both F1 and F2 (and potentially other frequency responses). In other words, the frequency response obtained from the solved for impulse response, when evaluated at one or more of the frequencies of the components that make up F1 or F2 (i.e., at one or more of the transmission frequencies of the orthogonal tones in the first and second OFDM signals), the obtained frequency response returns (at least) similar phases for those frequencies as F1 and F2. Many linear algebra techniques can be used to obtain an impulse response as noted above based on F1 and F2, including the technique of least squares. The obtained impulse response corresponds to an estimation of the impulse response $h_1[t]$ shown in FIG. 1.

Assuming that the frequency domain representation of the obtained impulse response $h_1[t]$ adequately approximates or fits both F1 and F2, the frequency domain representation of the obtained impulse response $h_1[t]$ can be evaluated at one or more frequencies that fall within the upstream frequency band to determine the frequency response of wireless channel 110 at those one or more frequencies. The determined frequency response information can then be used by mobile station 102 to perform transmit beamforming as would be appreciated by one of ordinary skill in the art.

For example, assuming that mobile station 102 transmits an OFDM signal to base station 104, mobile station 102 can evaluate the frequency domain representation of the impulse response $h_1[t]$ at the transmit frequency of one or more of the orthogonal tones that make up the OFDM signal to determine the frequency response of wireless channel 110 for those frequencies. The determined frequency response information can then be used by mobile station 102 to determine beam weights to adjust the phase of those orthogonal tones of the OFDM signal prior to transmission from antenna 106-1 to perform transmit beamforming as would be appreciated by one of ordinary skill in the art.

In a variant of the second embodiment of the open loop mode, mobile station 102 can determine two or more frequency responses based on a single OFDM signal transmitted by base station 104 over a downstream frequency band and use the joint information contained in the two or more frequency responses to perform transmit beamforming over an upstream frequency band. For example, assuming that the single OFDM signal transmitted by base station 104 is received by antenna 106-1 and includes a plurality of orthogonal tones spread over a particular 20 MHz frequency band of wireless channel 110, mobile station 102 can use known training sequences (e.g., in the form of preambles or pilot tones) carried by tones in a first sub-band (e.g., the upper 10 MHz) of the OFDM signal to estimate a frequency response of wireless channel 110 at the transmission frequencies of those tones in the first sub-band. This frequency response can be denoted F1. Similarly, mobile station 102 can use known training sequences (e.g., in the form of preambles or pilot tones) carried by tones in a second sub-band of the OFDM signal that is different from the first sub-band (e.g., the lower 10 MHz) to estimate a frequency response of wireless channel 110 at the transmission frequencies of those tones in the second sub-band. This frequency response can be denoted F2.

Once F1 and F2 are determined, mobile station 102 can then use linear algebra (e.g., the linear algebra technique of least squares) to solve for an impulse response that, when transformed into the frequency domain using the DFT, substantially approximates or fits both F1 and F2 (and potentially other frequency responses). The obtained impulse response corresponds to an estimation of the impulse response $h_1[t]$ shown in FIG. 1.

Assuming that the frequency domain representation of the obtained impulse response $h_1[t]$ adequately approximates both F1 and F2, the frequency domain representation of the obtained impulse response $h_1[t]$ can be evaluated at one or more frequencies that fall within the upstream frequency band to determine the frequency response of wireless channel 110 at those one or more frequencies. The determined frequency response information can then be used by mobile station 102 to perform transmit beamforming as would be appreciated by one of ordinary skill in the art.

It should be noted that one or more of the impulse responses $h_2[t]$-$h_1[t]$ can and should be obtained and transformed into the frequency domain using either variant of the second embodiment of the open-loop mode described above for $h_1[t]$ so that transmit beamforming can be performed. In addition, it should be noted that the impulse responses $h_1[t]$-$h_m[t]$ can be transformed into the frequency domain using the discrete Fourier transform (DFT) performed in hardware, software, or any combination thereof. In addition, it should be further noted that the frequency domain representation of the impulse response for a particular sub-channel can be referred to as the frequency response for that particular sub-channel.

In an embodiment, before one of the estimated impulse responses $h_1[t]-h_m[t]$, determined using either variant of the second embodiment of the open-loop mode described above, is transformed into the frequency domain, the phase $\theta_n$ and/or amplitude $\rho_n$ of one or more of its taps can be adjusted. For example, the phase $\theta_n$ and/or amplitude $\rho_n$ can be adjusted to account for a difference in frequency between the frequency bands in which the signals used to estimate the impulse response were received and the frequency band in which the frequency domain representation of the impulse response is to be evaluated. A linear model or an affine model of how the phase $\theta_n$ and/or amplitude $\rho_n$ change with frequency can be used to determine the adjustment.

In an embodiment, mobile station 102 can use one or more of the impulse responses $h_1[t]-h_m[t]$, determined using either variant of the second embodiment of the open-loop mode described above, to adjust state information of wireless channel 110 determined using the conventional closed-loop mode. More specifically, assuming feedback from base station 104 containing estimated state information of wireless channel 110 (or some compressed indication of this estimated state information of wireless channel 110) is received, mobile station 102 can use one or more of the impulse responses $h_1[t]-h_m[t]$ to adjust (or update) the state information fed back from base station 104. This can be advantageous in instances where the conventional closed-loop method is too slow to keep up with the changing state information of wireless channel 110 (e.g., due to movement of the transmitter and/or receiver). Once adjusted, the estimated state information fed back from base station 104 can be used to determine beam weights for performing transmit beamforming at mobile station 102.

It should be noted that mobile station 102 can alternatively use F1 and F2 (determined according to either variant of the second embodiment of the open-loop mode described above) to extrapolate frequency response information for one or more frequencies that fall within the upstream frequency band. The extrapolated frequency response information can be used by mobile station 102 to perform transmit beamforming over the upstream frequency band as would be appreciated by one of ordinary skill in the art based on the teachings herein.

c. Quality Determinations of Open-Loop Mode Estimations

Mobile station 102 can further determine a quality of the estimated impulses responses $h_1[t]-h_M[t]$ determined using at least one of the open-mode loop modes of estimation described above. Based on the quality measurement of the estimated impulses responses $h_1[t]-h_M[t]$, mobile station 102 can determine whether or not to use one or more of the impulses responses $h_1[t]-h_M[t]$ to perform transmit beamforming and/or other channel aware adaptive transmission techniques.

For example, where the second embodiment of the open loop mode (described above in Section II.b) is used, the quality of the solved for impulse response can be measured by evaluating the solved for impulse response at one or more of the frequencies of the components that make up the two frequency responses F1 and F2 (i.e., at one or more of the transmission frequencies of the orthogonal tones in the first and second OFDM signals). The frequency responses returned by the solved for impulse response can then be compared to the corresponding frequency responses of F1 and F2. In general, the smaller the difference between the frequency responses, the better the quality of the solved for impulse response.

In another example, mobile station 102 can determine a quality of an impulse response, such as $h_1[t]$, estimated using one of the open loop modes described above by comparing a delay spread of $h_1[t]$ and a delay spread of an additional impulse response determined for the same sub-channel as $h_1[t]$ and using one of the open-loop modes described above. The additional impulse response can be determined using a signal received by antenna 106-1 from base station 104 over a frequency band different than the one in which the signal used to determine $h_1[t]$ was received. In an embodiment, the delay spread of an impulse response is determined by estimating the difference between the time of arrival of the earliest significant multipath component and the time of arrival of the latest significant multipath component. Thus, for example, the delay spread of $h_1[t]$ can be estimated by taking the difference between the tap delays $\pi_{N-1}$ and $\tau_0$ in Eq. (1) above. In general, the smaller the difference between the two delay spreads, the better the quality of $h_1[t]$. In addition, or alternatively, the respective delay of one or more of the individual taps making up the two impulse responses can be compared. The smaller the difference between the delays of corresponding taps of the estimated impulse responses, the better the quality of $h_1[t]$.

In another embodiment, mobile station 102 can determine a quality of an impulse response, such as $h_1[t]$, estimated using one of the open loop modes described above by measuring the doppler shift and/or doppler spread of a signal received from base station 104. Both of these measurements provide an estimate of how fast wireless channel 110 is changing due to, for example, mobile station 102 moving relative to base station 104, or objects in the channel moving relative to mobile station 102 and base station 104. In general, the smaller the doppler shift and/or doppler spread, the slower wireless channel 110 is changing and the better the quality of $h_1[t]$.

In yet another embodiment, mobile station 102 can determine a quality of an impulse response, such as $h_1[t]$, estimated using one of the open loop modes described above based on a number of positive and negative acknowledgements received for packets transmitted to base station 104 using $h_1[t]$ to perform transmit beamforming. For example, if base station 104 receives a packet from mobile station 102, transmitted using beamforming, and the packet is received in error, base station 104 can transmit a negative acknowledgement to mobile station 102 for the packet. In general, the more positive acknowledgments and less negative acknowledgements received by mobile station 102 from base station 104 for packets transmitted to base station 104, the better the quality of $h_1[t]$.

In yet another embodiment, mobile station 102 can determine a quality of an impulse response, such as $h_1[t]$, estimated using one of the open loop modes described above by detecting a change in the radiation pattern of the antenna over which the signal used to estimate $h_1[t]$ was received, which is antenna 106-1 at mobile station 102 in this instance. A change in the radiation pattern of antenna 106-1 can be measured by measuring the antenna's associated voltage standing wave ratio (VSWR). Objects in the near field that change the antenna pattern will change the VSWR associated with antenna 106-1. Objects changing the pattern will also de-tune antenna 106-1, which can be detected by measuring its VSWR. A change in the radiation pattern of antenna 106-1 can signal a change in the near field of antenna 106-1. In general, the less change in the near field of antenna 106-1, the better the quality of $h_1[t]$.

In one embodiment, if the measured quality of the impulse responses estimated using one of the open loop modes is determined to be below a certain threshold, then mobile station 102 can forego using the estimated impulse responses to perform a channel aware adaptive transmission technique such as beamforming. If, on the other hand, the measured quality of the impulse responses estimated using one of the open loop modes is determined to be above a certain threshold, then mobile station 102 can use the estimated impulse responses to perform a channel aware adaptive transmission technique such as beamforming. The measured quality can be determined by one or more of the methods discussed above.

In another embodiment, mobile station 102 can perform a soft transition based on the measured quality of the impulse responses estimated using one of the open loop modes. For example, mobile station 102 can perform a soft transition from transmit beamforming, using the estimated impulse responses, to antenna selection, hybrid switching, or cyclic delay diversity (CDD). The transition to CDD can be accomplished, for example, using the following model:

$$h_{soft}[t] = \alpha\, h_{open\text{-}loop}[t] + (1-\alpha)\delta(t - T_{CDD}) \quad (2)$$

where $h_{soft}[t]$ is an impulse response for a particular sub-channel (e.g., the sub-channel between antenna 106-1 at mobile station 102 and antenna 108-$i$ at base station 104) determined using a soft transition, $h_{open\text{-}loop}[t]$ is an impulse response for the particular sub-channel estimated using one of the open loop modes, $\delta(t - T_{CDD})$ represents the Dirac delta function, $T_{CDD}$ is a value of time selected to achieve CDD within a given number of phase rolls in a target band, and $\alpha$ is used to provide the soft transition. In general, $\alpha$ is a function of the confidence in the quality of $h_{open\text{-}loop}[t]$ determined, for example, using on one or more of the methods of quality measurement discussed above, and can be made dependent on frequency. When $\alpha$ is 1, there is complete confidence in the quality of $h_{open\text{-}loop}[t]$ and beamforming is solely performed without CDD being performed. On the other hand, when $\alpha$ is 0, there is no confidence in the quality of $h_{open\text{-}loop}[t]$ and only CDD is performed. The value of $\alpha$ can range between 0 and 1 to provide a soft transition between performing transmit beamforming using $h_{open\text{-}loop}[t]$ to performing CDD, and vice-versa.

III. Example Transmitter for Implementing Open-Loop Estimation Mode

Figure 4:
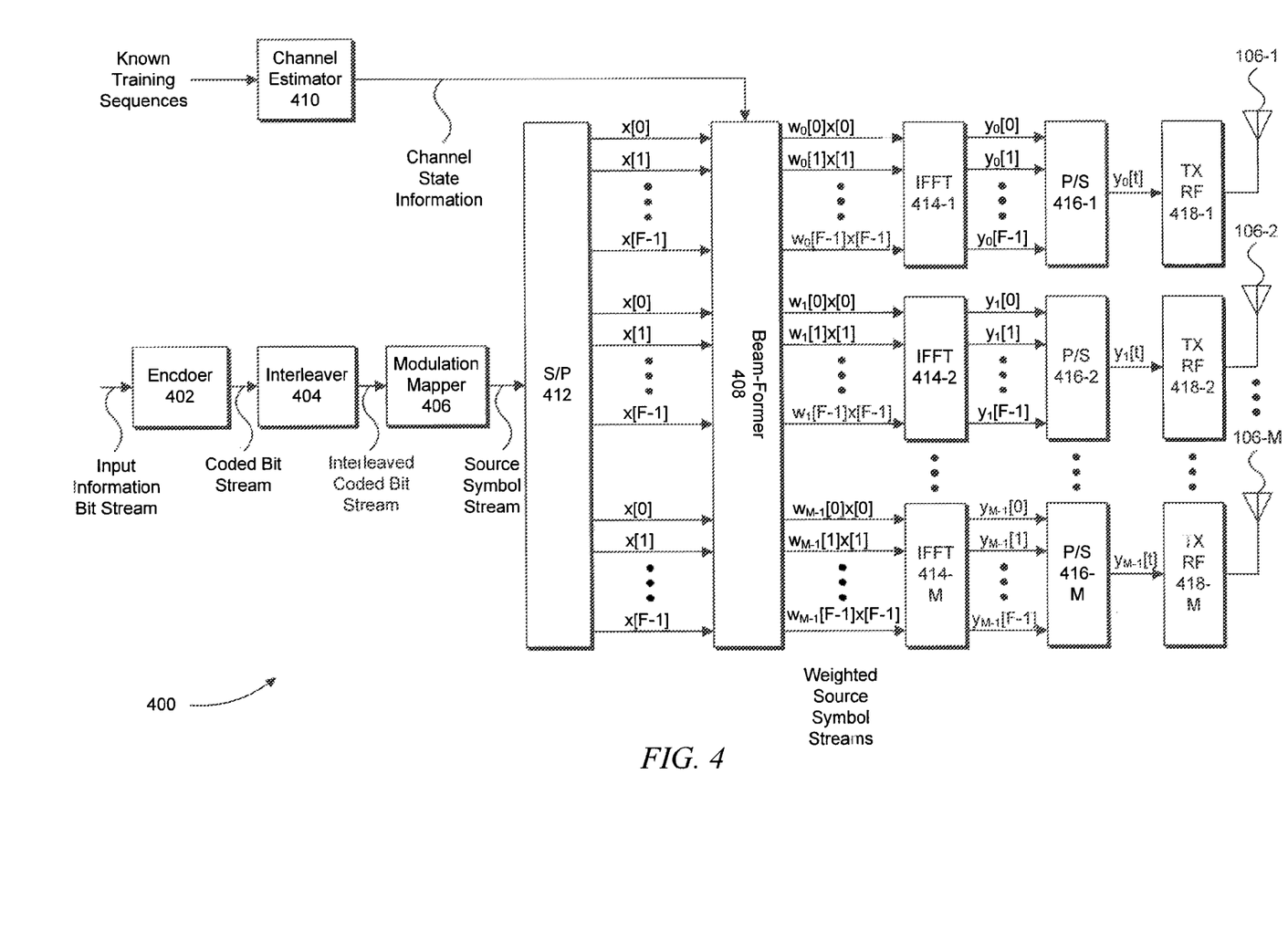
FIG. 4 illustrates an example transmitter in accordance with embodiments of the present disclosure.

Referring now to FIG. 4, an example transmitter 400 that can be used by mobile station 102 to implement one or more of the open-loop modes described above is illustrated in accordance with an embodiment of the present disclosure. Transmitter 400 uses an OFDM encoding scheme, as described above, for transmitting data over a large number of orthogonal tones.

In operation, encoder 402 receives an input information bit stream (e.g., a voice, video, or any other application or program specific information bit stream) destined for transmission. Encoder 402 adds redundant data to the input information bit stream to produce a coded bit stream. The redundant data is a function of the original bits of the input information bit stream and allows the receiving system to detect and correct for errors caused by corruption from the channel and the receiving system. The total amount of useful information sent (i.e. non-redundant data) is typically defined by the code rate, k/n; for every k bits of useful information (i.e., the original bits of the input information bit stream), n bits of data are generated. Encoder 402 can encode the input data stream using, for example, low-density parity check (LDPC) encoding or turbo encoding. In addition, encoder 402 can append cyclic redundancy checks (CRCs) to blocks of the input information bit stream.

After encoding, interleaver 404 (optionally included in transmitter 400) rearranges the coded bit stream to produce an interleaved coded bit stream. Rearranging of the coded bit stream mitigates the effects of burst errors that can occur during transmission and reception by "spreading" errors out over the coded bit stream.

Modulation mapper 406 subsequently gathers the bits of the interleaved coded bit stream into groups and maps the groups to a series of complex symbols, referred to as source symbols, using any one of a number of different digital modulation techniques, including quadrature amplitude modulation (QAM) and quadrature phase shift keying (QPSK). The number of bits in each group dictates the constellation size of the digital modulation technique used. For example, if groups of six bits are formed, then the constellation of the digital modulation scheme includes at least $2^6$ or 64 different complex symbols.

The serial stream of source symbols provided by modulation mapper 406 is received next by S/P module 412. S/P module 412 divides the serial stream of source symbols into F parallel symbol streams. The F parallel symbol streams are treated as though they are in the frequency-domain and are used as inputs to a series of inverse fast Fourier transform (IFFT) blocks 414-1 through 414-M (or as inputs to one IFFT block that is time-multiplexed) that transform them into the time-domain. In other words, each of IFFT blocks 414-1 through 414-M receives a copy of the same F parallel symbol streams. IFFT blocks 414-1 through 414-M take in F source symbols at a time (labeled x[0]-x[F-1] in FIG. 4), one from each of the F parallel symbol streams, and use each of the F symbols to modulate the amplitude and phase of a different one of F orthogonal sinusoidal basis functions (referred to as tones). Each IFFT block provides F time-domain samples (labeled y[0]-y[F-1] in FIG. 4) as output that represent the summation of the F orthogonal sinusoidal basis functions after having been respectively modulated by the F source symbols. The F time-domain samples from each IFFT block form a single OFDM symbol and are respectively serialized by P/S modules 416-1 through 416-M, up-converted to a carrier frequency by TX RF modules 418-1 through 418-M, and transmitted by antennas 106-1 through 106-M.

Beamformer 408 applies a different set of beam weights to the OFDM symbols before they are transmitted by antennas 106-1 through 106-M. More specifically, prior to each IFFT block 414-1 through 414-M receiving the same F source symbols from S/P module 412, beamformer 408 applies a different set of beam weights to each copy. The sets of beam weights include F complex weights, one for each of the F source symbols, and are used by beamformer 408 to adjust the respective magnitudes and/or phases of the F source symbols. For example, beamformer 408 respectively applies the set of beam weights $w_0[0]$-$w_0[F-1]$ to the F source symbols x[0]-x[F-1] that IFFT block 414-1 receives. Similarly, beamformer 408 applies the set of beam weights $w_1[0]$-$w_1[F-1]$ to the F source symbols x[0]-x[F-1] that IFFT block 414-2 receives.

In order to improve the SINR at base station 104 (i.e., at the intended receiver) using transmit beamforming, the values of the different sets of beam weights ($w_0[f]$-$w_{M-1}[f]$, where f=0, 1, . . . , F-1) are determined by beamformer 408 based on estimated state information of the wireless channel used to convey the transmit signal between wireless transmitter 400 and base station 104. Channel estimator 410 is configured process a signal (e.g., including known training sequences) sent from base station 104 and received mobile station 102 and estimate the channel state information using the signal and one or more of the open-loop modes described above. In at least one embodiment, the signal sent from base station 104 is received by antennas 106-1 through 106-M. Once estimated, channel estimator 410 can provide the channel state information to beamformer 408 to determine the beam weights.

Channel estimator 410 can further include a DFT block for transforming channel state information in the form of time-domain impulse responses into frequency responses. The DFT block can specifically transform channel state information in the form of time-domain impulse responses into frequency responses using, for example, the fast Fourier transform (FFT). In addition, channel estimator 410 can further include a quality measurement block for determining a quality channel state information estimated using one or more of the open-loop modes. For example, the quality measurement block can perform one or more of the quality measures discussed above in Section II.c.

Channel estimator 410 can be implemented in hardware using analog and/or digital circuits, in software, through the execution of instructions by one or more general purpose or special-purpose processors, or as a combination of hardware and software.

IV. Example Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
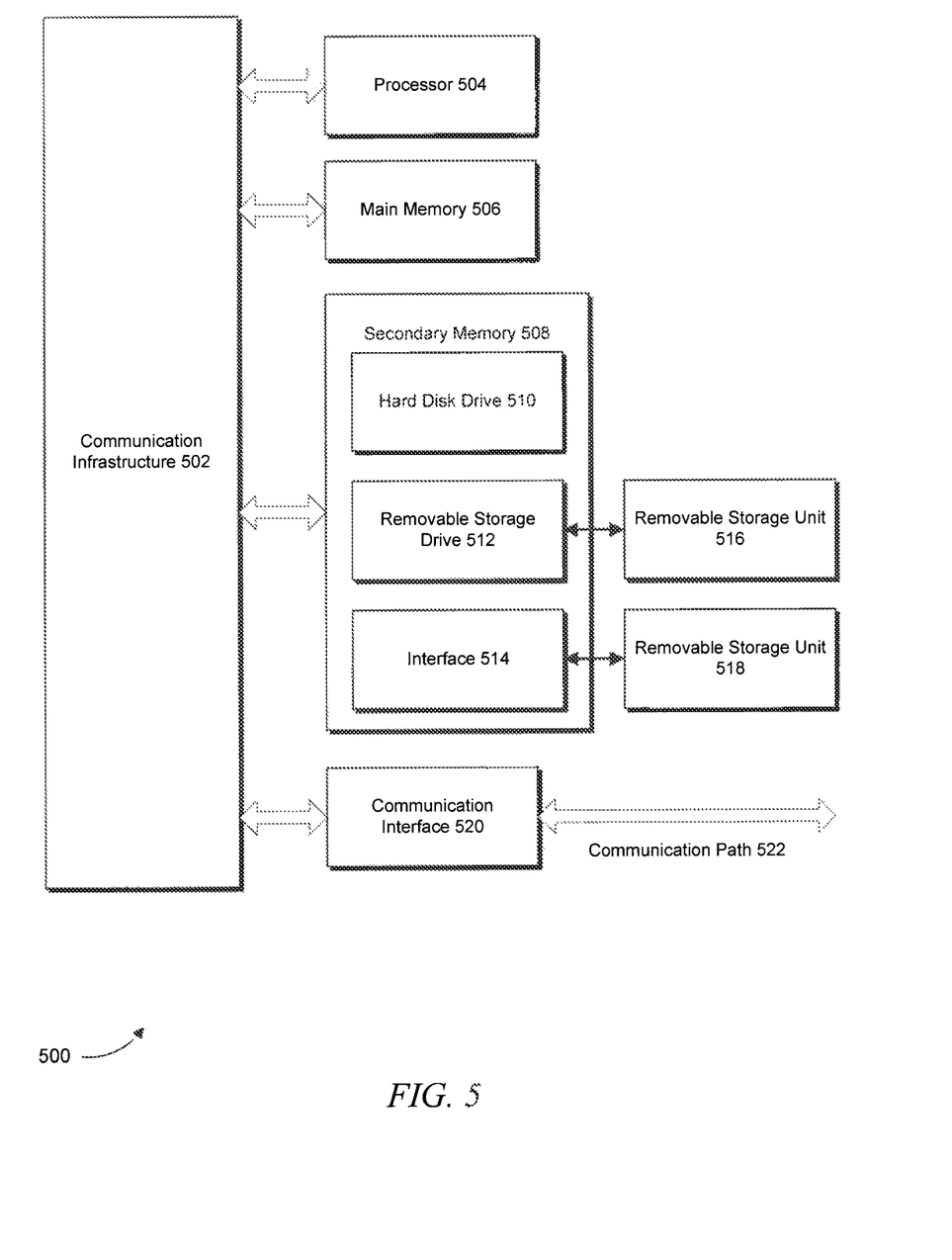
FIG. 5 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. All of the modules depicted in FIG. 4 (e.g., encoder 402, interleaver 404, modulation mapper 406, beamformer 408, etc.), with the exception of DAC and TX RF modules 418-1 through 418-M, can execute on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

In addition, while various embodiments have been described above, it should be understood that they have been presented by way of example only, and not limitation. It will be understood by those skilled in the relevant art(s) that various changes in form and details can be made to the embodiments described herein without departing from the spirit and scope of the disclosure as defined in the appended claims. Accordingly, the breadth and scope of the present disclosure should not be limited by any of the above-described exemplary embodiments, but should be defined only in accordance with the following claims and their equivalents.

It should be noted that the state information estimated using the open-loop mode described above can be used by mobile station 102 to perform transmit beamforming or some other channel aware adaptive transmission scheme. For example, other channel aware adaptive transmission schemes that can be performed include antenna selection (i.e., selecting the antenna at the transmitter from which to solely transmit from based on the antenna that provides the highest SINR at the receiver), hybrid switching described in U.S. patent application Ser. No. 12/287,619 (which is incorporated by reference herein), and smart cyclic delay diversity described in U.S. patent application Ser. No. 12/815,540 (which is further incorporated by reference herein). It should also be noted that, although base station 104 is shown in FIG. 1 as having only a single transmit antenna 108-*i*, in other embodiments base station 104 can include multiple transmit antennas.

What is claimed is:

1. A method for performing an adaptive transmission scheme in a frequency division duplexing communication system, the method comprising:
   estimating a first impulse response of a channel using a signal received over a first frequency band of the channel from a device;
   transforming, by a processor, the first impulse response into a first frequency response of the channel; and
   performing the adaptive transmission scheme using the first frequency response of the channel to transmit a signal to the device over a second frequency band of the channel,
   wherein the first frequency band is different from the second frequency band.

2. The method of claim 1, wherein performing the adaptive transmission scheme further comprises:
   using state information of the channel determined based on feedback received from the device.

3. The method of claim 2, wherein using the state information of the channel further comprises:
   adjusting the state information based on the first impulse response or the first frequency response.

4. The method of claim 1, further comprising:
   estimating a second frequency response of the channel using a signal received over a third frequency band of the channel from the device; and
   solving for a third impulse response that, when transformed into a third frequency response, approximates both the first frequency response and the second frequency response.

5. The method of claim 4, wherein solving for a third impulse response comprises:
   using a linear algebra technique to fit the first frequency response and the second frequency response to the third frequency response.

6. The method of claim 4, further comprising:
   determining a quality of the third impulse response by evaluating the third frequency response at one or more frequencies of components that make up the first frequency response or the second frequency response.

7. The method of claim 1, further comprising:
   determining a quality of the first impulse response based on a change in a radiation pattern of an antenna used to transmit the signal to the second device.

8. The method of claim 1, further comprising:
   determining a quality of the first impulse response based on a doppler shift of a signal transmitted over the channel.

9. The method of claim 1, further comprising:
   determining a quality of the first impulse response of the channel based on a doppler spread of a signal transmitted over the channel.

10. The method of claim 1, further comprising:
    determining a quality of the first impulse response based on a number of positive and negative acknowledgements received for packets transmitted to the device using the adaptive transmission scheme.

11. The method of claim 1, further comprising:
    estimating a second impulse response of the channel using a signal received from the device over a third frequency band; and
    determining a quality of the first impulse response by comparing a delay spread of the first impulse response to a delay spread of the second impulse response.

12. The method of claim 1, wherein the adaptive transmission scheme is beamforming.

13. The method of claim 1, wherein the adaptive transmission scheme is antenna selection, hybrid switching, or smart cyclic delay diversity.

14. A method for performing an adaptive transmission scheme in a frequency division duplexing communication, the method comprising:
    estimating a first frequency response of a channel using a signal received over a first frequency band of the channel from a device;
    estimating a second frequency response of the channel using a signal received over a second frequency band of the channel from the device;
    solving, by a processor, for an impulse response that approximates both the first frequency response and the second frequency response when the impulse response is transformed into a third frequency response; and
    performing the adaptive transmission scheme using the third frequency response to transmit a signal to the device over a third frequency band of the channel,
    wherein the first frequency band, the second frequency band, and the third frequency band are different.

15. The method of claim 14, wherein solving for the impulse response comprises:
    using a linear algebra technique to fit the first frequency response and the second frequency response to the third frequency response.

16. The method of claim 14, further comprising:
    determining a quality of the third impulse response by evaluating the third frequency response at one or more frequencies of components that make up the first frequency response or the second frequency response.

17. The method of claim 14, wherein the adaptive transmission scheme is beamforming.

18. A transmitter for performing an adaptive transmission scheme in a frequency division duplexing communication system comprising:
- a channel estimator, implemented at least in part using a processor, configured to estimate an impulse response of a channel using a signal received over a first frequency band of the channel from a device;
- a discrete Fourier Transform (DFT) hardware block configured to transform the impulse response into a frequency response of the channel; and
- an adaptive transmission scheme hardware module configured to perform the adaptive transmission scheme using the frequency response to transmit a signal to the device over a second frequency band of the channel.

19. The transmitter of claim 18, wherein the adaptive transmission scheme is beamforming.

20. The transmitter of claim 18, wherein the adaptive transmission scheme is antenna selection, transmit switching, hybrid switching, or smart cyclic delay diversity.

21. A method for performing an adaptive transmission scheme in a frequency division duplexing communication system, the method comprising:
- estimating a first frequency response of a channel using a signal received over a first frequency band of the channel from a device;
- performing, by a processor, extrapolation on the first frequency response to determine frequency response information for frequencies outside the first frequency band; and
- performing the adaptive transmission scheme using the frequency response information to transmit a signal to the device over a second frequency band of the channel,
- wherein the first frequency band is different from the second frequency band.

* * * * *